(12) United States Patent
Suzuki et al.

(10) Patent No.: US 7,789,458 B2
(45) Date of Patent: Sep. 7, 2010

(54) STRUCTURE OF COUPLING PORTIONS OF EXTERIOR PARTS

(75) Inventors: Susumu Suzuki, Atsugi (JP); Nobuhiro Iwai, Atsugi (JP); Taro Ikeda, Sagamihara (JP); Naoki Tanaka, Atsugi (JP); Hiroyuki Okuyama, Ebina (JP); Michiaki Okabe, Isehara (JP); Tsuyoshi Iwasaki, Yokohama (JP); Toru Mogi, Fujisawa (JP); Koji Ishimaru, Yamato (JP); Takashi Ashida, Zama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 224 days.

(21) Appl. No.: 12/141,494

(22) Filed: Jun. 18, 2008

(65) Prior Publication Data

US 2008/0315625 A1   Dec. 25, 2008

(30) Foreign Application Priority Data

Jun. 22, 2007   (JP) ............................. 2007-164701
Dec. 13, 2007  (JP) ............................. 2007-321733

(51) Int. Cl.
*B60N 99/00* (2006.01)
(52) U.S. Cl. .................. 296/198; 296/193.09
(58) Field of Classification Search ............ 296/187.01, 296/187.09, 193.09, 198
See application file for complete search history.

(56) References Cited

FOREIGN PATENT DOCUMENTS

| | | |
|---|---|---|
| DE | 19813596 | 9/1999 |
| EP | 0834686 | 4/1998 |
| JP | 2003341418 | 12/2003 |
| JP | 2005-75337 | 3/2005 |

OTHER PUBLICATIONS

Patent Abstract of Japan, Japanese Application No. 2005-075337, published Mar. 24, 2005 (1 page).
European Search Report for Patent Application No. 08158531.7, dated Jun. 23, 2009 (6 pages).
English Patent Abstract of DE19813596 from esp@cenet, Published Sep. 30, 1999 (1 page).
English Patent Abstract of JP2003341418 from esp@cenet, Published Dec. 3, 2003 (1 page).
English Patent Abstract of EP0834686 from esp@cenet, Published Apr. 8, 1998 (1 page).

*Primary Examiner*—Lori L Lyjak
(74) *Attorney, Agent, or Firm*—Osha Liang LLP

(57) ABSTRACT

A structure to couple exterior components of a vehicle includes a first exterior component and a second exterior component located apart from the first exterior component, wherein the first exterior component comprises an upper protrusion configured to overlap the second exterior component, and wherein the first exterior component comprises a side protrusion configured to overlap the second exterior component. A method to couple exterior components of a vehicle includes providing a protrusion about at least a portion of a first exterior component, installing the first exterior component proximal to a second exterior component, overlapping the protrusion of the first exterior component about a at least a portion of the second exterior component, interposing an elastic member between a peripheral surface of the first exterior component and an edge of the second exterior component, and positioning the elastic member beneath the protrusion of the first exterior component.

17 Claims, 5 Drawing Sheets

STRUCTURE OF COUPLING PORTIONS OF EXTERIOR PARTS

CROSS-REFERENCE TO RELATED APPLICATIONS

The present application claims priority from Japanese Patent Application No. 2007-164701, filed Jun. 22, 2007 and Japanese Patent Application No. 2007-321733 Filed Dec. 13, 2007. The contents of both priority applications are hereby incorporated by reference in their entirety.

BACKGROUND OF THE DISCLOSURE

1. Field of the Disclosure

The present disclosure relates to a structure of coupling portions of exterior parts, and more particularly to a structure of coupling portions of a headlight and an edge of a fender provided around the headlight.

2. Description of the Related Art

In general, a headlight of an automobile has an ear-like portion at the periphery of the headlight. The ear-like portion is mounted to a fender edge with a screw, and hence, the headlight is fixed to a front portion of a vehicle body. With such a headlight, if the headlight collides with an obstacle, the impact force may break the ear-like portion, and the headlight may be displaced toward the inside of the vehicle body (mainly downward), so as to reduce the impact force against the obstacle.

When the headlight is mounted to the fender, a gap is provided between the periphery of the headlight and the fender edge. If the gap is too large and is noticeable, the appearance of the vehicle may be degraded.

To prevent this, a mounting structure of a headlight is known in which a peripheral surface portion of the headlight vertically overlaps a fender edge at the boundary of the headlight and the fender, so that a gap between the peripherally surface portion of the headlight and the fender edge is less noticeable. However, if the overlap amount is not sufficient, a gap between the peripheral surface of the headlight and the fender edge may still be visible from the outside. Thus, the appearance of the vehicle is not satisfactory.

Therefore, a mounting structure of a headlight has been suggested in which a peripheral surface of the headlight vertically overlaps a fender edge, and a gap between the peripheral surface of the headlight and the fender edge is decreased (for example, see Japanese Unexamined Patent Application Publication No. 2005-75337).

However, with the above structure, if the headlight collides with an obstacle and is displaced toward the inside of a vehicle body, the overlap portion of the peripheral surface of the headlight may become hooked onto the fender edge. As such, the displacement of the headlight toward the inside of the vehicle body may be prevented, and it may be difficult to sufficiently reduce the impact force against the obstacle.

Also, because the gap between the peripheral surface of the headlight and the fender edge is decreased, the peripheral surface of the headlight may rub on the fender edge when the headlight is displaced toward the inside of the vehicle body, resulting in the coating of the fender edge (e.g., paint, clear coat, etc) possibly being removed, resulting in the rusting of the fender edge.

SUMMARY OF THE CLAIMED SUBJECT MATTER

In one aspect, the present disclosure relates to a structure to couple exterior components of a vehicle including a first exterior component, and a second exterior component located apart from the first exterior component, wherein the first exterior component comprises an upper protrusion configured to overlap the second exterior component, and wherein the first exterior component comprises a side protrusion configured to overlap the second exterior component.

In another aspect, the present disclosure relates to a method to couple exterior components of a vehicle including providing a protrusion about at least a portion of a first exterior component installing the first exterior component proximal to a second exterior component, overlapping the protrusion of the first exterior component about a at least a portion of the second exterior component, interposing an elastic member between a peripheral surface of the first exterior component and an edge of the second exterior component, and positioning the elastic member beneath the protrusion of the first exterior component.

In another aspect, the present disclosure relates to a structure to couple exterior components of a vehicle including a first exterior component provided on the vehicle, and a second exterior component located apart from the first exterior component, wherein the first exterior component comprises a protrusion means for overlapping the second exterior component, and a gasket means for filling a space located between a peripheral surface of the first exterior component and an edge of the second exterior component, wherein the gasket means is positioned beneath the protrusion means.

BRIEF DESCRIPTION OF DRAWINGS

Features of the present disclosure will become more apparent from the following description in conjunction with the accompanying drawings.

DETAILED DESCRIPTION

An exemplary embodiment in accordance with the present disclosure is described below with reference to the attached drawings.

Figure 1:
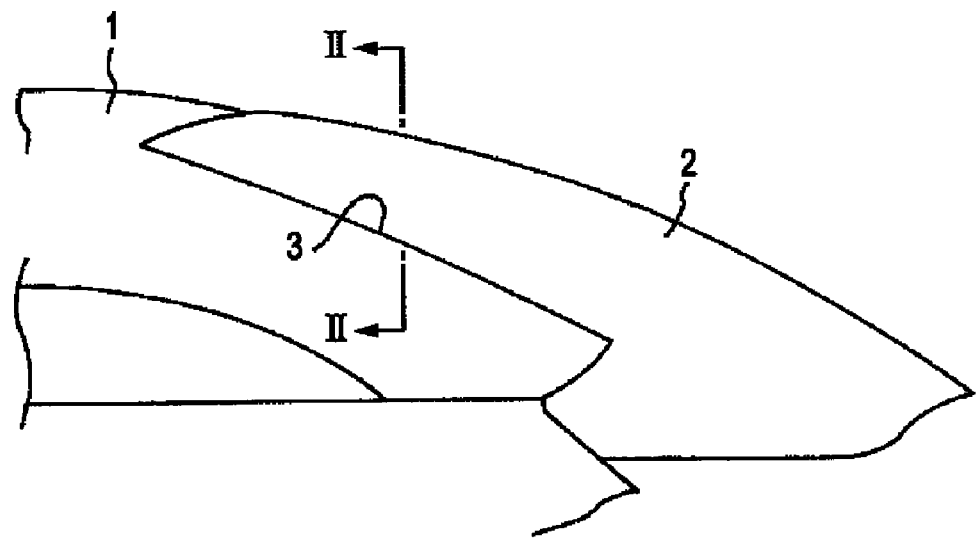
FIG. 1 is a right side view showing a headlight and a peripheral structure of the headlight.
Figure 2:
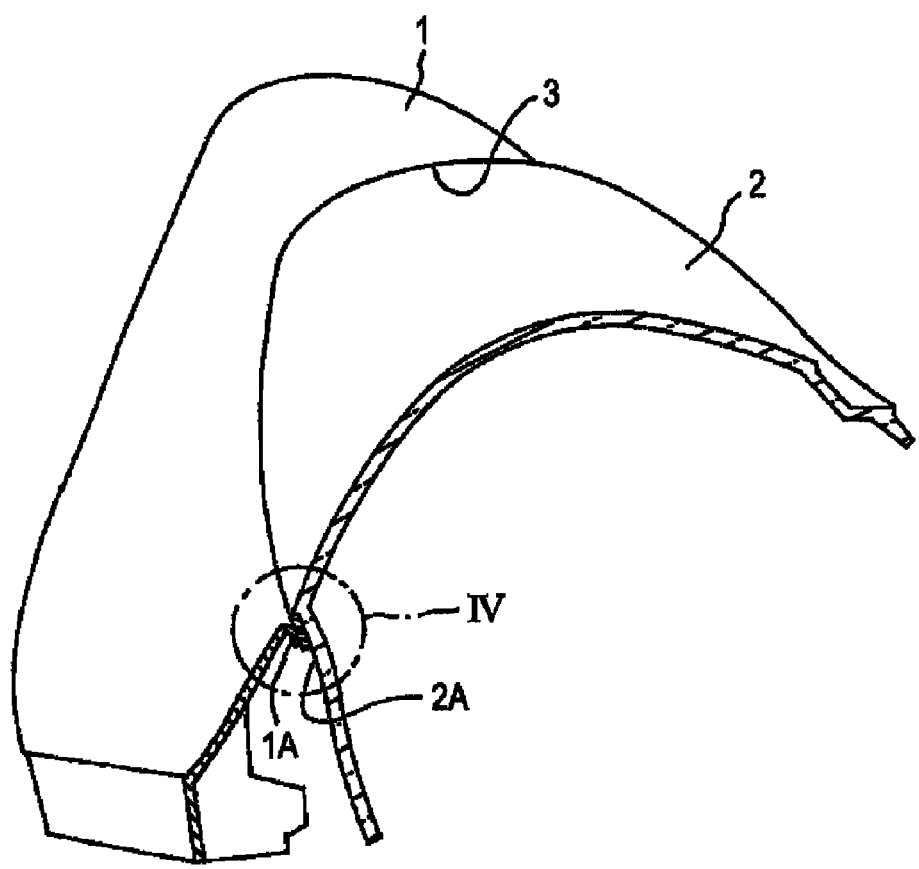
FIG. 2 is a perspective view taken along line 11-1 in FIG. 1.

FIGS. 1 and 2 illustrate a headlight and a peripheral structure of the headlight. FIG. 1 is a right side view and FIG. 2 is a perspective view taken along line II-II of FIG. 1. FIGS. 1 and 2 show the right-side configuration of a vehicle. The left-side configuration of the vehicle may be symmetrical to the configuration showing in FIGS. 1 and 2 with respect to the center of the vehicle.

As shown in FIG. 1, a headlight 2 may be provided at a front end portion of a fender (e.g., a front fender) 1. In particular, a cut portion 3 may be formed at the fender 1. Cut portion 3 may extend from an upper surface of the front portion to a side surface of the front portion. Headlight 2 may be inserted to cut portion 3. As shown in FIG. 2, headlight 2 may have a peripheral surface including a right peripheral surface 2A (on the left side in FIG. 2) and a rear peripheral surface 2B. The fender 1 has an edge (hereinafter, referred to as a fender edge 1A) arranged near the right peripheral surface 2A. The headlight 2 serves as a first exterior part. The fender 1 serves as a second exterior part. The peripheral surface 2A of the headlight 2 serves as a coupling portion of the first exterior part. The fender edge 1A of the fender 1 serves as a coupling portion of the second exterior part.

Figure 3:
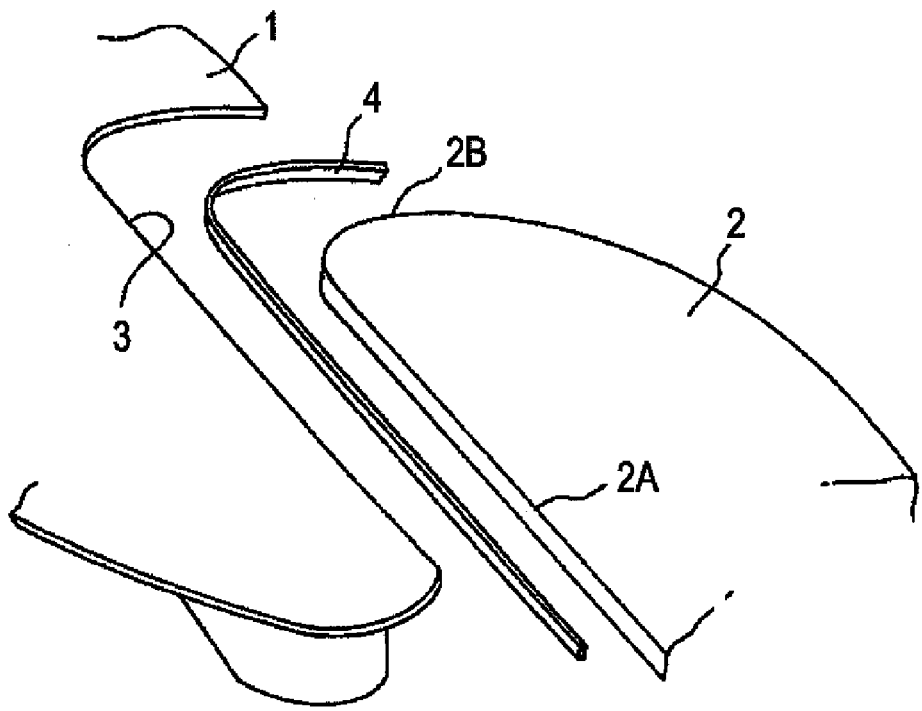
FIG. 3 is an exploded perspective view showing the headlight and the peripheral structure of the headlight.

As shown in FIG. 3, an elastic member 4 may be interposed between the fender edge 1A and the peripheral surface 2A of the headlight 2. The elastic member 4 may be a narrow band, and, in selected embodiments, may have a substantially inverted L shape when viewed from the above. The elastic member 4 may be arranged to be in contact with the right peripheral surface 2A and the rear peripheral surface 2B of the headlight 2.

Figure 4:
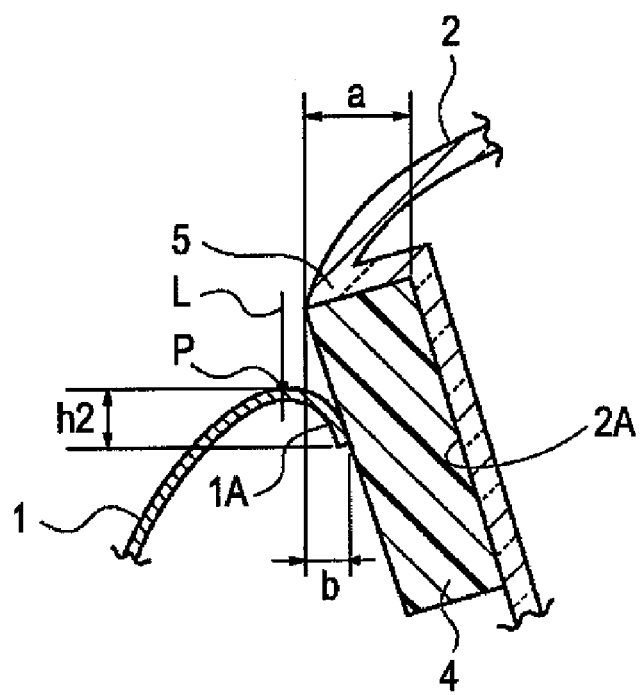
FIG. 4 is an enlarged view showing part IV in FIG. 2.

FIG. 4 is an enlarged view showing view IV in FIG. 2. As shown in FIG. 4, the peripheral surface 2A of the headlight 2 upwardly protrudes with respect to the fender edge 1A of the fender 1. The peripheral surface 2A of the headlight 2 has a protruding portion 5 at an upper portion thereof. The protruding portion 5 protrudes toward the outside in a vehicle width direction. The fender edge 1A may be downwardly bent and arranged below the protruding portion 5. That is, when viewed from the above, the fender edge 1A overlaps the protruding portion 5. Item b denotes an amount of overlap of protruding portion 5 over fender edge 1A. A gap may be provided between the fender edge 1A and the peripheral surface 2A of the headlight 2. That is, the fender edge 1A may be arranged apart from the peripheral surface 2A.

As described above, the fender 1 may include the downwardly bent fender edge 1A. The fender 1 may have an upwardly bent portion which may be located near the fender edge 1A and near the outside in the vehicle width direction with respect to the fender edge 1A. The upwardly bent portion defines the highest position of the fender 1, that is, it defines a topmost portion P. The topmost portion P may be arranged near the outside in the vehicle width direction with respect to the position of an end portion of the protruding portion 5 provided at the headlight 2. In other words, a vertical line L passing through the topmost portion P may be located near the outside (in the vehicle width direction with respect to the end portion) of the protruding portion 5.

Although not shown, the protruding portion 5 may also be provided at an upper portion of the peripheral surface 2B of the headlight 2 (see FIG. 3). The fender edge 1A facing the peripheral surface 2B may be downwardly bent, and this bent fender edge 1A may be arranged below the protruding portion 5. A gap may be provided between the fender edge 1A facing the peripheral surface 2B and the peripheral surface 2B. That is, the fender edge 1A may be arranged apart from the peripheral surface 2B.

As shown in FIG. 4, a protruding amount of the protruding portion 5 may be referred to as a step width a. The step width a may be determined when the headlight 2 is designed. Also, a length of the downwardly bent portion of the fender edge 1A, which may be a length h2 in the vertical direction from the topmost portion P to a lower tip of the fender edge 1A of the fender 1, may be determined when the headlight 2 is designed.

The overlap amount b of the protruding portion 5 and the fender edge 1A may be desirably small, more particularly, 2 mm or smaller (in a range of from 0 to 2 mm). If the overlap amount b is above 2 mm, the protruding portion 5 may become hooked onto the fender edge 1A when the headlight 2 collides with an obstacle M (see FIG. 6) and the headlight 2 is only slightly displaced toward the inside of the vehicle body (downwardly). Thus, it is difficult to sufficiently reduce the impact force.

The elastic member 4 may be made of rubber, polypropylene, or any other material known to those having ordinary skill in the art. In selected embodiments, the rigidity of the elastic member 4 may be in a range of from 0.01 to 2 GPa. In selected embodiments, the rigidity of rubber may be about 0.01 GPa, and the rigidity of polypropylene may be about 2 GPa. Also, at least the surface of the elastic member 4 may be black, so as to be less noticeable when viewed from the outside.

Next, an action of selected embodiments will be described.

Figure 6:
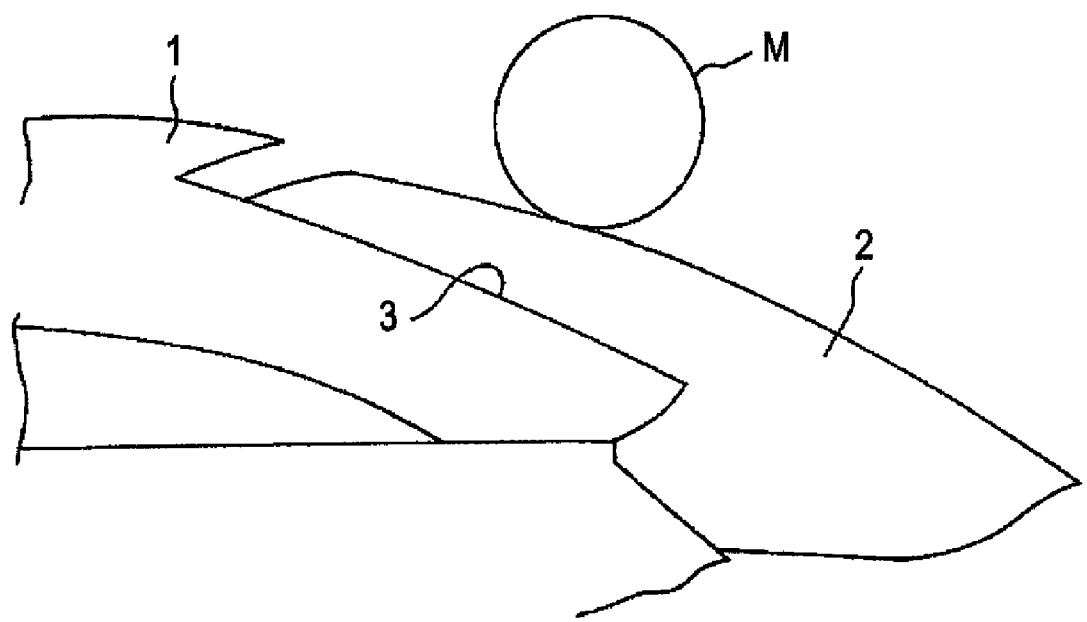
FIG. 6 is an illustration in a state where the headlight collides with an obstacle, and thus the headlight is downwardly displaced.

The protruding portion 5 may be provided at the peripheral surfaces 2A and 2B of the headlight 2, and the fender edge 1A may be arranged below the protruding portion 5 so as to be overlapped by protruding portion 5. Accordingly, when the headlight 2 collides with the obstacle M as shown in FIG. 6, the headlight 2 may be easily displaced toward the inside of the vehicle body until the protruding portion 5 comes into contact with the fender edge 1A. As a result, the impact force against the obstacle M can be sufficiently reduced. FIG. 6 illustrates a state where the headlight 2 collides with the obstacle M and the headlight 2 may be displaced downward.

In addition, the peripheral surfaces 2A and 2B of the headlight 2 may be arranged apart from the fender edge 1A. Accordingly, when the headlight 2 is displaced toward the inside of the vehicle body, the peripheral surfaces 2A and 2B of the headlight 2 would not be rubbed on the fender edge 1A. Hence, the coating of the surface (e.g., paint) of the fender edge 1A may be prevented from being removed.

Figure 5:
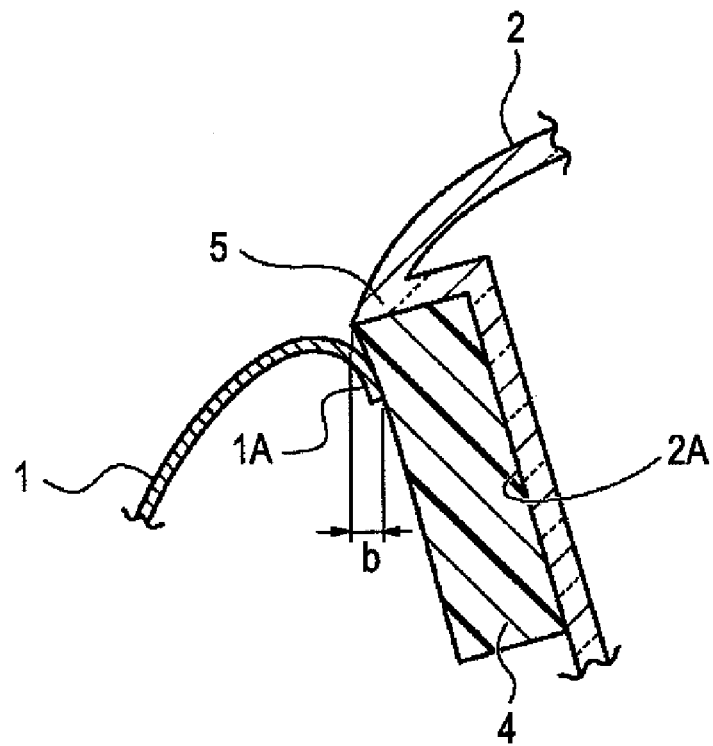
FIG. 5 is an illustration in a state where the headlight is downwardly displaced, and thus an elastic member is deformed.

FIG. 5 illustrates a state where the headlight 2 is downwardly displaced, and thus the elastic member 4 may be deformed. At this time, the overlap amount b of the protruding portion 5 and the fender edge 1A may be smaller than that in FIG. 4.

Figure 7:
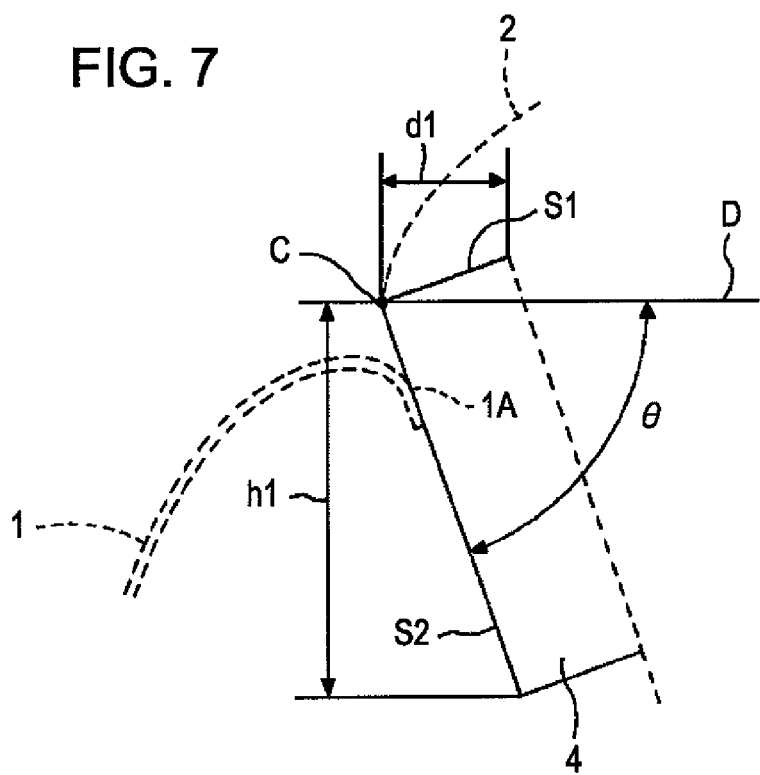
FIG. 7 is a diagram showing a relationship between the elastic member and portions around the headlight when the elastic member has a rectangular cross section.

As shown in FIG. 7, the elastic member 4 may have a rectangular cross section. With the rectangular cross section, the headlight 2 may be easily displaced toward the inside of the vehicle body when the headlight 2 collides with the obstacle M. An upper surface S1 of the elastic member 4 may be in contact with the protruding portion 5 of the headlight 2, whereas a side surface S2 thereof located near the outside in the vehicle width direction may be in contact with the fender edge 1A. A horizontal plane D passing through an intersection C of the upper surface S1 and the side surface S2 may be located at an angle θ from side surface S2. In selected embodiments, angle θ may be greater than or equal to 60 degrees. In embodiments having an angle θ 60 degrees or larger, headlight 2 may be easily displaced toward the inside of the vehicle body when the headlight 2 collides with the obstacle M.

Furthermore, in selected embodiments, the elastic member 4 may satisfy the following conditions:

d1≈a (shown in FIG. 4); and $h1 \geq h2$ (shown in FIG. 4), where d1 (shown in FIG. 7) is a width of the upper surface S1 in the horizontal direction, and h1 is a height of the side surface S2 in the vertical direction. Dimension a refers to the step width of FIG. 4, and dimension h2 refers to the vertical height between topmost portion P and fender edge 1A of FIG. 4.

Figure 8:
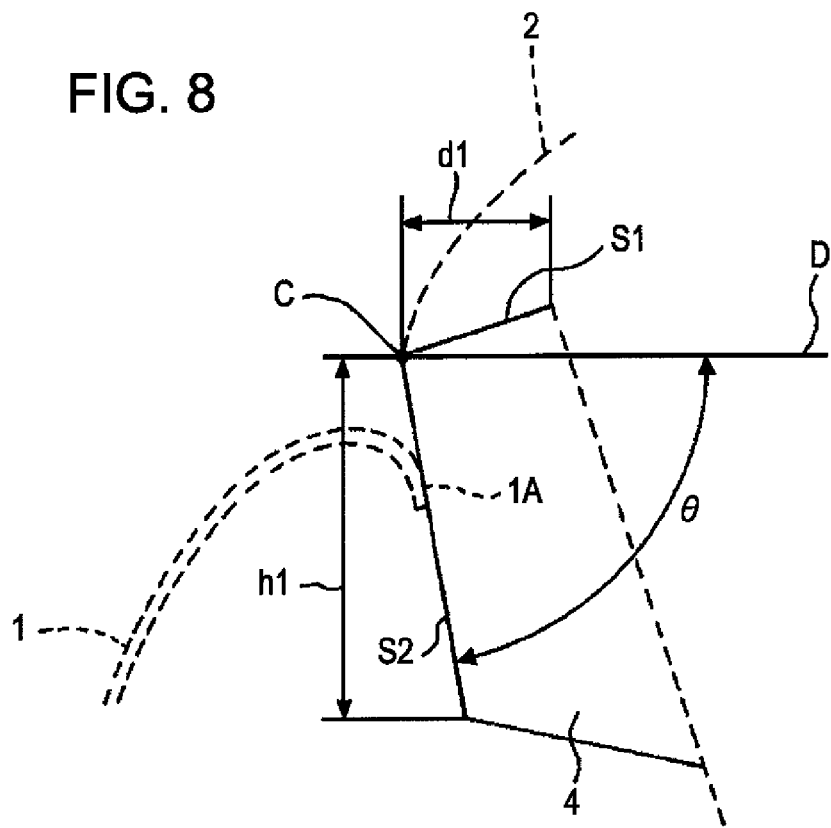
FIG. 8 is a diagram showing a relationship between the elastic member and the portions around the headlight when the elastic member has a trapezoidal cross section.
Figure 9:
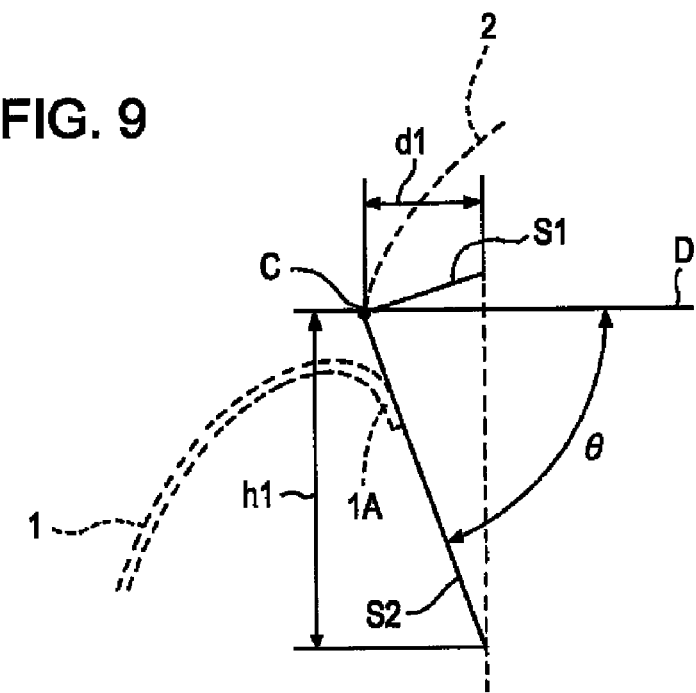
FIG. 9 is a diagram showing a relationship between the elastic member and the portions around the headlight when the elastic member has a triangular cross section.

The cross section of the elastic member 4 does not have to be rectangular, and may be trapezoidal (e.g., FIG. 8), or triangular (e.g., FIG. 9). Even with the elastic member 4 having a trapezoidal or triangular cross section, the headlight 2 may be easily displaced toward the inside of the vehicle body when the headlight 2 collides with the obstacle M. As shown in FIG. 8 or 9, the angle θ may still be 60 degrees or larger, $d1 \approx a$, and $h1 \geq h2$.

Next, described here is the setting of the rigidity of the elastic member 4 in a range of from 0.01 to 2 GPa.

Figure 10:
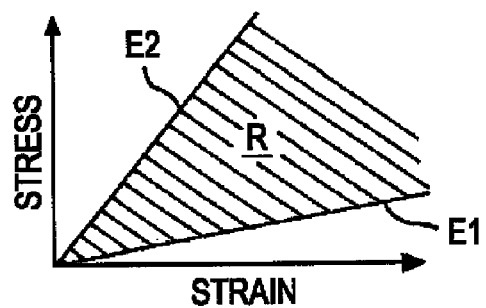
FIG. 10 is a graph showing a relationship between a strain of the elastic member and a stress in the elastic member when an external force is applied to the elastic member.

FIG. 10 illustrates a relationship between stress and strain of the elastic member 4 when an external force is be applied thereto. Herein, E1 may be set to a value allowing the overlap amount b (see FIG. 4) to be small when the headlight 2 may be displaced toward the inside of the vehicle body upon collision with the obstacle M and the elastic member 4 interferes with the fender edge 1A. For example, E1 shown in FIG. 10 may represent an embodiment where the elastic member 4 is made of rubber (e.g., rigidity: about 0.01 GPa), the step width a is 10 mm, and the overlap amount b is 0 mm.

E2 may represent an embodiment where the stress-strain relationship prevents the coating of the fender edge 1A from being removed due to the contact pressure between the fender edge 1A and the elastic member 4 in a normal state (not in a collision state). If the headlight 2 is made of polycarbonate, the material of the elastic member 4 may be polypropylene (rigidity: about 2 GPa) having a rigidity smaller than that of polycarbonate. Thus, E2 may represent a case where the elastic member 4 is made of polypropylene.

A region R defined between E1 and E2 may therefore represent a rigidity region for elastic member 4, capable of reducing the impact force against the obstacle M, thereby providing both satisfactory appearance and coating protection.

With this embodiment, because the elastic member 4 may be arranged below the protruding portion 5, the gap between the peripheral surfaces 2A, 2B of the headlight 2 and the fender edge 1A may be filled. Thus, the appearance may be satisfactory. Although the fender edge 1A may be rubbed on the elastic member 4 when the headlight 2 is displaced toward the inside of the vehicle body, the object to be rubbed is elastic. Thus, the coating of the fender edge 1A would not be removed.

Because the topmost portion P of the fender 1 may be located near the outside in the vehicle width direction with respect to the end portion of the protruding portion 5 of the headlight 2, the protruding portion 5 of the headlight 2 is hardly hooked onto the fender edge 1A upon the collision of the obstacle M. Thus, the topmost portion P would not disturb the reduction of the impact force against the obstacle M.

In selected embodiments, as the rigidity of the elastic member 4 may be in the range of from 0.01 to 2 GPa, the headlight 2 may be displaced toward the inside of the vehicle body upon the collision with the obstacle M without removing the coating of the fender edge 1A.

Figure 11:
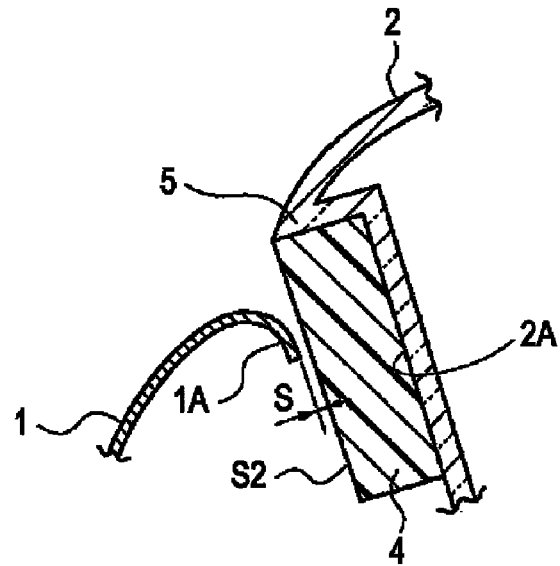
FIG. 11 is an illustration showing a modification of FIG. 4.

Furthermore, while fender edge 1A may be shown in selected embodiments in contact with side surface S2 of elastic member 4 in the normal state, it should be understood that a gap S may be provided between the fender edge 1A and the side surface S2 of the elastic member 4 as shown in FIG. 11. Furthermore, embodiments in accordance with the present disclosure may be applied not only to the fender and the headlight, but also to combinations of fenders, bumpers, headlights, etc.

Advantageously, a structure of coupling portions of exterior parts may be capable of reducing an impact force against an obstacle when an exterior part such as a headlight collides with the obstacle. Furthermore, the structure may be capable of preventing the headlight or the like from being rubbed on an edge of a fender or the like which is an exterior part arranged around the headlight or the like when the headlight is displaced toward the inside of a vehicle body to reduce the impact force.

While the disclosure has been presented with respect to a limited number of embodiments, those skilled in the art, having benefit of this disclosure, will appreciate that other embodiments may be devised which do not depart from the scope of the present disclosure. Accordingly, the scope of the disclosure should be limited only by the attached claims.

What is claimed is:

1. A structure to couple exterior components of a vehicle, comprising:
    a first exterior component comprising an upper protrusion and a side protrusion protruding from the upper protrusion in a vehicle width direction;
    a second exterior component located apart from the first exterior component, the second exterior component arranged below the side protrusion in a vertical direction of the vehicle and overlapping the side protrusion when viewed from above; and
    an elastic member disposed between the second exterior component and the side protrusion and configured to displace the first exterior component downwardly by deformation when the first exterior component collides with an obstacle, and configured to reduce the impact force against the obstacle.

2. The structure of claim 1, wherein the first exterior component comprises a headlight, and the second exterior component comprises a fender.

3. The structure of claim 2, wherein an end portion of the fender is downwardly bent, and an apex of the bent end portion is located proximal to an end portion of one of the upper protrusion and the side protrusion of the headlight.

4. The structure of claim 1, wherein the elastic member comprises a rigidity in a range between about 0.01 GPa to about 2 GPa.

5. The structure of claim 1, wherein the elastic member comprises rubber.

6. The structure of claim 1, wherein the elastic member comprises polypropylene.

7. The structure of claim 1, wherein the elastic member comprises a black color in at least a region visible between the first and the second exterior components.

8. The structure of claim 1, wherein an overlap over the second exterior component by at least one of the upper protrusion and the side protrusion is about 2 mm or less.

9. A method to couple exterior components of a vehicle, comprising:
    providing a first exterior component comprising an upper protrusion and a side protrusion protruding from the upper protrusion in a vehicle width direction;
    installing the first exterior component proximal to a second exterior component;
    overlapping the side protrusion of the first exterior component about at least a portion of the second exterior component when viewed from above;

interposing an elastic member between the second exterior component and the side component; and positioning the elastic member beneath the protrusion of the first exterior component; and configuring the elastic member to displace the first exterior component downwardly by deformation when the first exterior component collides with an obstacle and to reduce the impact force against the obstacle.

10. The method of claim 9, further comprising downwardly bending an end portion of the second vehicle component such that an apex portion of the bent end portion is located proximal to an end portion of the protrusion of the first exterior component.

11. The method of claim 9, wherein the first exterior component comprises a headlight and the second exterior component comprises a fender.

12. The method of claim 9, wherein an overlap of the second exterior component by the protrusion of the first exterior component is about 2 mm or less.

13. A structure to couple exterior components of a vehicle, comprising:

a first exterior component provided on the vehicle comprising an upper protrusion and a side protrusion protruding from the upper protrusion in a vehicle width direction; and a second exterior component located apart from the first exterior component, the second exterior component arranged below the side protrusion in a vertical direction of the vehicle and overlapping the side protrusion when viewed from above;

and a gasket means for filling a space disposed between the second exterior component and the side protrusion and configured to displace the first exterior component downwardly by deformation when the first exterior component collides with an obstacle, and configured to reduce the impact force against the obstacle.

14. The structure of claim 13, wherein the gasket means comprises an elastic member comprising a rigidity between about 0.01 GPa and about 2 GPa.

15. The structure of claim 13, wherein the first exterior component comprises a headlight and the second exterior component comprises a fender.

16. The structure of claim 13, wherein the gasket means comprises a black color.

17. The structure of claim 13, wherein the protrusion means overlaps the second exterior component by about 2 mm or less.

* * * * *